United States Patent [19]
Kawasaki

[11] Patent Number: 5,314,536
[45] Date of Patent: May 24, 1994

[54] METHOD OF MAKING LUMINOUS CONSTRUCTION MATERIAL

[76] Inventor: Masaki Kawasaki, 171-3, Oaza Nishiiribe, Sawara-ku, Fukuoka-shi, Fukuoka, 811-11, Japan

[21] Appl. No.: 920,402

[22] Filed: Jul. 27, 1992

[30] Foreign Application Priority Data

Nov. 26, 1990 [JP] Japan .................................. 2-324949
Apr. 30, 1991 [JP] Japan .................................. 3-98520

[51] Int. Cl.$^5$ ............................................. C04B 14/04
[52] U.S. Cl. .............................. 106/712; 252/301.6 P; 264/DIG. 43
[58] Field of Search .................. 106/817, 712, 716; 252/301.16, 301.6 P; 264/DIG. 43; 427/64; 428/204, 208, 240, 242, 917; C04B 14/04

[56] References Cited

U.S. PATENT DOCUMENTS 4,172,063  10/1979  O'Brill ......................... 252/301.16

OTHER PUBLICATIONS

Chemical Abstract "Luminous Concrete" FR 90644 (1968) (Jan. 19, 1968) Desmars.

Primary Examiner—Mark L. Bell
Assistant Examiner—Paul Marcantoni
Attorney, Agent, or Firm—Thomas R. Morrison

[57] ABSTRACT

A method of making a construction material luminous in response to ultraviolet rays. An inorganic material containing an ultraviolet luminous substance can be used as pigment after formed into gravelish, sandy or fragmentary material and, thus, a sufficient amount of luminance thereof can be ensured over long years while being prevented from deterioration with time of pigment. In particular, when using as inorganic materials ores containing ultraviolet luminous substance which is obtainable at a low price, pigment can be prepared at a low cost and patterned and decorated construction materials can also be manufactured at a low cost. Further, with the use of a large number of small pieces containing ultraviolet luminous substances as a pattern composing pieces, patterns complicated in shape and various in color can easily be produced on the surface of a construction material.

17 Claims, 6 Drawing Sheets

METHOD OF MAKING LUMINOUS CONSTRUCTION MATERIAL

TECHNICAL FIELD

This invention relates to a method of making a construction material luminous with ultraviolet rays.

BACKGROUND ART

Construction materials, such as concrete blocks and tiles, which can be used as flooring material or walling material for buildings, houses and other various structures have been used in a number of forms. In one of the forms, a paint containing an organic pigment which comprises a substance luminous with ultraviolet rays or the like is blown to the surface of the construction material to provide a pattern or decoration for attracting attention.

However, such patterned or decorated construction materials have problems yet to be solved, as follows.

First, the pattern or decoration is formed of a paint containing an organic pigment and, therefore, is deteriorated rapidly with time. Thus, periodic repainting has been necessary.

Secondly, the organic pigment comprising an ultraviolet luminous substance is very expensive and is limited in the amount thereof used. Therefore, it has been impossible to obtain a satisfactory luminous effect.

Accordingly, it is an object of this invention to provide a method of making a luminous construction material by which the above-mentioned problems can be solved.

DISCLOSURE OF INVENTION

This invention relates to a method of making a luminous construction material comprising: preparing an inorganic material containing an ultraviolet luminous substance, in the form of a gravelish material, a sandy material, a fragmentary material (inclusive of a small-platelike material and a small-lumpy material), or a pellet-like material; and admixing a concrete with said gravelish, sandy, fragmentary or pellet-like material and making the resultant admixture into a block or other construction material.

Also, this invention relates to a method of making a luminous construction material comprising: preparing an inorganic material containing an ultraviolet luminous substance, in the form of a gravelish material, a sandy material, a fragmentary material (inclusive of a small-platelike material and a small-lumpy material), or a pellet-like material; and admixing a concrete with said gravelish, sandy, fragmentary or pellet-like material and making the resultant admixture into a surface layer of a block or other construction material.

Further, this invention relates to a method of making a luminous construction material comprising: mixing at least one of an ore containing a component luminous with ultraviolet rays and an artificially refined inorganic ultraviolet luminous component into a concrete in a massive or minutely dispersed form; molding, hardening and curing said concrete in a desired shape to make a concrete block; and cutting said concrete block to produce a plurality of plate-shaped luminous construction materials comprising the ultraviolet luminous component scattered or discretely contained in a concrete substrate.

As the concrete referred to herein, an admixture of a cement and water, an admixture of a cement, water and aggregate, and a resin concrete can be used.

The above-described gravelish, sandy or fragmentary material can be produced by crushing or cutting the inorganic material which may be an ore containing an ultraviolet luminous substance or be an artificial stone.

On the other hand, the pellet-like material can be produced by pelletizing an unsaturated polyester or the like containing an ultraviolet luminous substance.

Further, the gravelish, sandy, fragmentary or pellet-like material can also be used as pattern composing pieces in a luminous construction material.

BRIEF DESCRIPTION OF DRAWINGS

FIG. 1a represents the ore 10, FIG. 1b represents a gravelish material, FIG. 1c represents the process wherein the gravelish material is poured into a mold, FIG. 1d represents a mold into which water is poured, and FIG. 1e is the resultant concrete-made luminous construction material 17 when it is taken out of the mold 15.

FIG. 2a represents ore 20, FIG. 2b represents the minute-grained sandy material 21, FIG. 2c shows the surface-forming material 23 when it is poured into a mold 24, FIG. 2d represents a minute-grained sandy material, and FIG. 2e represents the resultant concrete-made luminous construction material 26 when it is taken out of the mold 24.

FIG. 3a shows a natural stone 30, FIG. 3b shows slices 31 which are cut from natural stone 30, FIG. 3c shows slices 31 which are diced to form small pieces 32, FIG. 3d shows a mold 33 containing small pieces 32, FIG. 3e shows the process of adding concrete into mold 33 nd curing mold 33 to solidify, and FI. 3f shows the object molded in mold 33 by curing and solidification after it is taken out of mold 33.

FIG. 4a shows ore 40, FIG. 4b shows gravelish materials 41, 42 and 43 after ore 40 is crushed, FIG. 4c shows the process of mixing gravelish material 41, 42 and 43 with block-forming material 44, followed by pouring the mixture into mold 45, FIG. 4d shows the resulting concrete block 46 after its taken out of mold 45, and FIG. 4e shows ultraviolet luminous sheets 47, produced from concrete block 46.

BEST MODE FOR CARRYING OUT THE INVENTION

This invention will now be described in detail below with reference to the accompanying drawings.

EMBODIMENT 1

A first embodiment of this invention will be described with reference to the flow sheet shown in FIGS. 1a–1e.

Figure 1A:
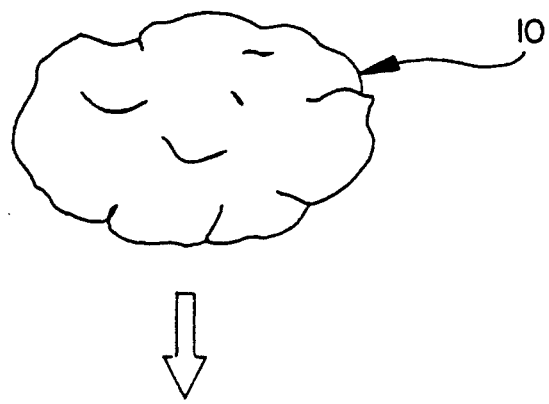
FIGS. 1a–e are an illustration of processing steps in the method of making a luminous construction material according to a first embodiment of this invention.

First, as shown in FIG. 1(a), an ore 10 containing an ultraviolet luminous substance is prepared as an inorganic material containing an ultraviolet luminous substance.

Such ores 10 are materials luminous with ultraviolet rays. At present, about 200 or more kinds of such ultraviolet luminous ores are known. Among the ores, those containing calcium, magnesium, potassium, manganese, uranium or a halogen element are particularly preferred, in view of good luminous properties.

These ores 10 can be classified by luminescent color, as follows:

| White to yellow: | Apatite |
| --- | --- |
| Barite | |
| Diaspore | |
| Diopside | |
| Powellite | |
| Scheelite or tungsten ore | |
| Wollastonite | |
| Orange: | |
| Aragonite | |
| Diaspore | Diopside |
| Fluorite | |
| Hedenbergite | |
| Sphalerite | |
| Pink to red: | |
| Aragonite | |
| Calcite | |
| Diamond | |
| Sodalite | |
| Spinel | |
| Yellowish brown: | |
| Aragonite | |
| Barite | |
| Diaspore | |
| Dolomite | |
| Fluorite | |
| Powellite | |
| Sapphire | |
| Sphalerite | |
| Wollastonite | |
| Zincite | |
| Green: | |
| Aragonite | |
| Gypsum | |
| Topaz | |
| Willemite | |
| Wollastonite | |
| Blue: | |
| Amethyst | |
| Fluorite | |
| Scheelite | |
| Wollastonite | |
| Wolframite | |
| Yellow: | |
| Garnet | |

Figure 1B:
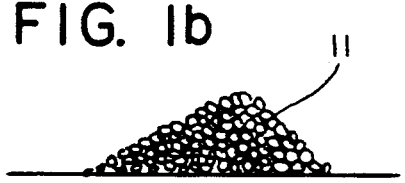

Next, the ore 10 is crushed by a crushing device such as a jaw crusher, to produce a gravelish material 11 having appropriate size and shape, as shown in FIG. 1(b).

The gravelish material 11 is taken admixed with a cement 12, sand 13 and water to prepare a slurry form surface-forming material 14.

The composition of the surface-forming material 14 may be, for example, from 40 to 50 parts by weight of the cement 12, from 10 to 30 parts by weight of the sand 13, from 15 to 25 parts by weight of water, and from 10 to 30 parts by weight of the gravelish material 11.

Figure 1C:
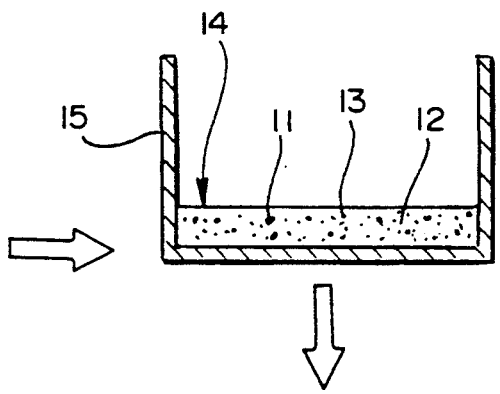
Figure 1E:
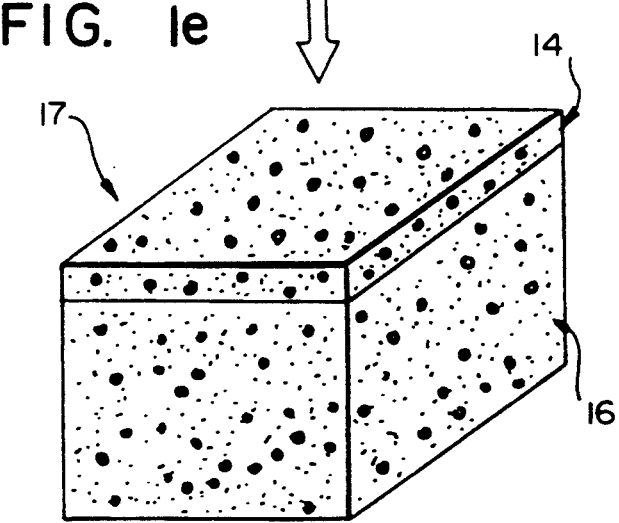
Figure 1D:
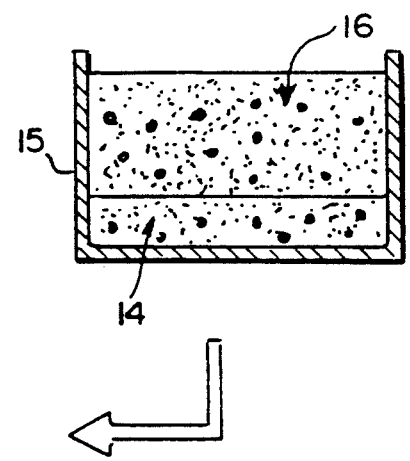

Subsequently, the surface-forming material 14 is poured into a mold 15, as shown in FIG. 1(c). Simultaneously with completion of the pouring operation or after curing for a predetermined period of time, a concrete 16 having an ordinary composition, namely, a mixture of a cement, aggregate (e.g., sands, gravels, etc.) and water is poured into the mold 15, as shown in FIG. 1(d), and is cured for a predetermined period of time. After the surface-forming material 14 and the concrete 16 are cured and hardened sufficiently, the resultant concrete-made luminous construction material 17 is taken out of the mold 15, as shown in FIG. 1(e). Where the concrete 16 is poured into the mold 15 after the cure of the surface-forming material 14, the adhesion of the surface-forming material 14 to the concrete 16 can be increased by rendering the surface of the surface-forming material 14 rough, as shown in FIG. 1(c), before pouring the concrete 16.

Then, after the surface-forming material 14 is cured sufficiently, the surface of the surface coating material 14 is polished by a desired polishing device, whereby a plate- or block-shaped luminous construction material 17 according to this invention can be obtained, with the gravelish material 11 exposed to the surface.

The luminous construction material 17 obtained by the above processing steps has the following characteristic features.

(1) The ore 10 constituting the inorganic material can be used as pigment in a gravelish form, so that a sufficient amount of luminance can be ensured over many years, with prevention of the deterioration with time of pigment.

(2) Especially where the ores 10 containing ultraviolet luminous substances are used to constitute the inorganic material, the availability of the ores 10 at low price makes it possible to prepare a pigment at low cost and to manufacture a patterned or decorated construction material at low cost.

Besides, though not shown, it is possible to produce a plate- or block-shaped luminous construction material 17 itself from the same composition as the above-described surface-forming material 14 or from an admixture of said composition with an ordinary aggregate, such as gravels and sands.

Furthermore, as the concrete 16, for example, a resin concrete containing an unsaturated polyester resin as a main constituent can also be used.

EMBODIMENT 2

A second embodiment of this invention will be described below with reference to the flow sheet shown in FIGS. 2a–2e.

Figure 2A:
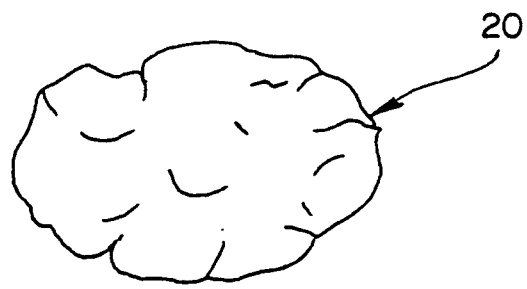
FIGS. 2a–e are an illustration of processing steps in the method of making a luminous construction material according to a second embodiment of this invention.

First, as shown in FIG. 2(a), an ore 20 containing an ultraviolet luminous substance is prepared as an inorganic material containing an ultraviolet luminous substance.

As the ore 20, minerals having the same compositions as those in Embodiment 1 can be used.

Figure 2B:
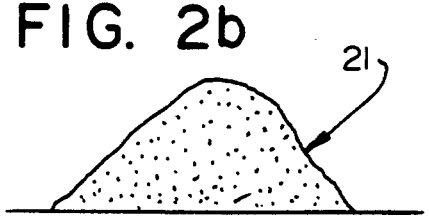

The ore 20 is then crushed by a crushing device such as a jaw crusher, a ball mill, etc. to prepare a minute-grained sandy material 21, as shown in FIG. 2(b). The sandy material 21 is then admixed with a cement 22 and water to prepare a surface-forming material 23.

The composition of the surface-forming material 23 may be, for example, from 40 to 50 parts by weight of the cement 12, from 10 to 30 parts by weight of the sandy material 21, and from 15 to 25 parts by weight of water.

Figure 2C:
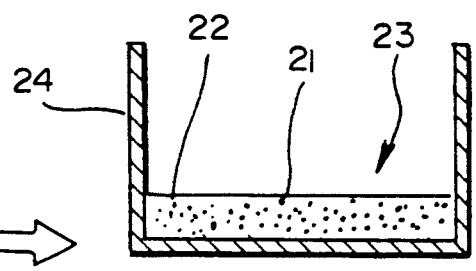
Figure 2E:
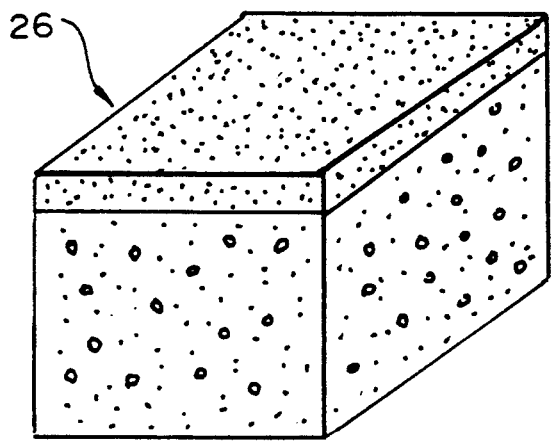
Figure 2D:
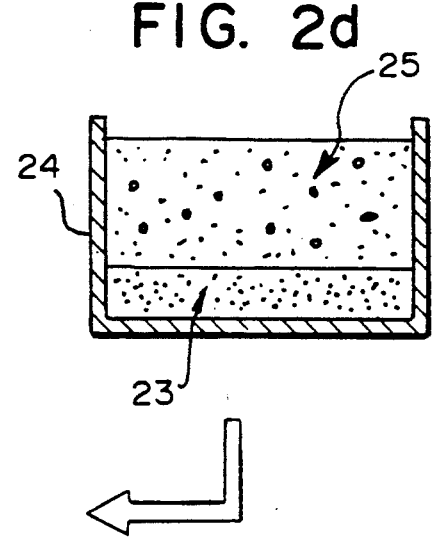

Subsequently, the surface-forming material 23 is poured into a mold 24, as shown in FIG. 2(c). Simultaneously with completion of the pouring operation or after curing for a predetermined period of time, a concrete 25 having an ordinary composition, namely, a mixture of a cement, aggregate (e.g., sands, gravels, etc.) and water is poured into the mold 24, as shown in FIG. 2(d), and is cured for a predetermined period of time. After the surface-forming material 23 and the concrete 25 are cured and hardened sufficiently, the resultant concrete-made luminous construction material 26 is taken out of the mold 24, as shown in FIG. 2(e). The adhesion of the surface-forming material 23 to the concrete 25 can be increased by rendering the surface of the surface-forming material 23 rough, as shown in FIG. 2(c), before coating the concrete 25 onto the surface-forming material 23.

Then, after the surface-forming material 23 is hardened sufficiently, the surface of the surface coating material 23 is polished by a desired polishing device, whereby a plate- or block-shaped luminous construction material 26 according to this invention can be produced, with the sandy material 21 exposed to the surface.

The luminous construction material 26 obtained by the above processing steps, like the above-described luminous construction material 17, has the following characteristic features.

(1) The ore 20 constituting the inorganic material can be used as pigment in a sandy form, so that a sufficient amount of luminance can be ensured for many years, with prevention of the deterioration with time of pigment.

(2) Especially where the ores 20 containing ultraviolet luminous substances are used to constitute the inorganic material, the availability of the ores 20 at low price makes it possible to prepare a pigment at low cost and to manufacture a patterned or decorated construction material at low cost.

Besides, though not shown, it is possible to produce a plate- or block-shaped luminous construction material 17 itself from the same composition as the above-described surface-forming material 23 or from an admixture of said composition With an ordinary aggregate, such as gravels and sands.

Furthermore, as the concrete 16, for example, a resin concrete containing an unsaturated polyester resin as a main constituent can also be used.

EMBODIMENT 3

This embodiment is essentially characterized in that the gravelish material 1 and the sandy material 22 prepared from ultraviolet luminous ores in the above Embodiments 1 and 2, respectively, are both incorporated in a surface coating material.

In this case, use of ultraviolet luminous ores which are luminous only with longer-wavelength ultraviolet rays and only with shorter-wavelength ultraviolet rays, respectively, ensures that two kinds of luminescence differing in color can be obtained with the same luminous construction material 25 by appropriately changing the wavelength of the ultraviolet rays with which the construction material 25 is irradiated.

EMBODIMENT 4

This embodiment essentially relates to a method of making a luminous construction material which comprises forming an inorganic material containing an ultraviolet luminous substance into a fragmentary material (inclusive of a small-platelike material and a small-lumpy material), admixing a concrete with gravelish, sandy or fragmentary material construction material.

Figure 3A:
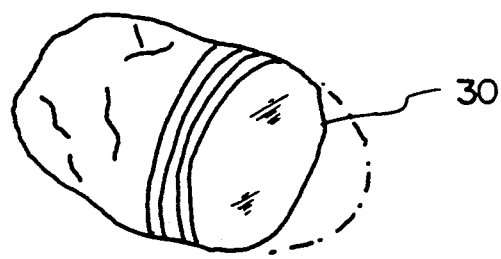
FIGS. 3a–f are an illustration of processing steps in the method of making a luminous construction material according to a fourth embodiment of this invention.
Figure 3B:
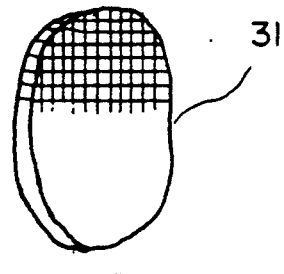

As shown in FIGS. 3(a) and 3(b), a natural stone 30 containing a luminous substance is first cut to a desired thickness, for example from 1 mm to several millimeters, by a diamond cutter or the like, to form a plurality of slices 31.

Figure 3C:
Figure 3D:
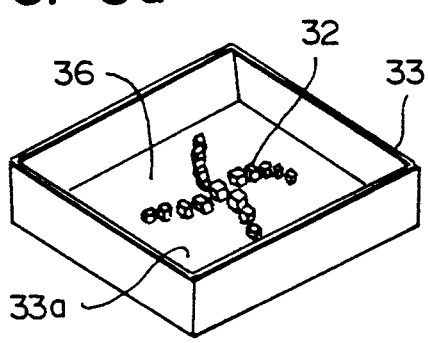
Figure 3E:
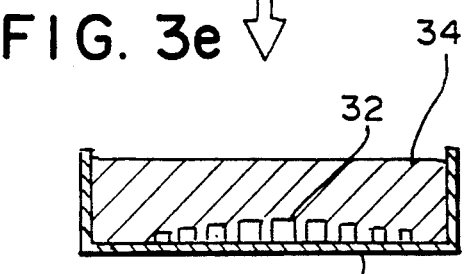
Figure 3F:
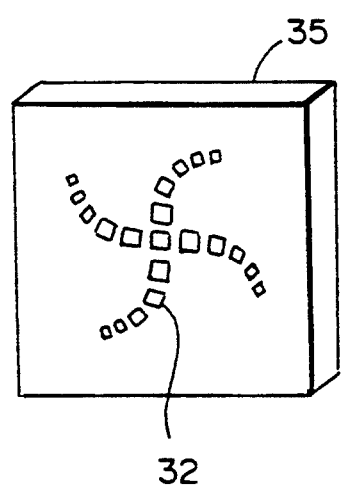

Next, as shown in FIG. 3(c), the slices 31 are diced, to form small pieces 32.

The small pieces 32 are preliminarily placed on a bottom plate 33a of a mold 33 made of film 36 such as paper, as shown FIG. 2(d) and a concrete 34 is then poured into the mold 33 and cured to solidify, as shown in FIG. 2(e).

The object thus molded in the mold 33 by curing and solidification is taken out of the mold 33, as shown in FIG. 2(f). The film 36 is released from the surface of the molded object, and the surface thus exposed is polished, whereby a luminous construction material 35 can be produced which is provided at a surface thereof with a desired pattern composed of the small pieces 32.

Although this embodiment has been described with reference to the case of using an ordinary concrete 34, a resin concrete can also be used for the same purpose.

Besides, though this embodiment has been described as using a natural stone 30, an artificial stone formed of an unsaturated polyester resin or the like containing an inorganic luminous substance can also be used, as in the other embodiments described above.

Also usable as a substitute for the natural stone 30 is a material prepared by binding so-called mine dust, which is by-produced during cutting off a luminous ore at a mine or the like, with a resin.

While the method of making a luminous construction material according to this invention has been described with reference to Embodiments 1, 2, 3 and 4 as above, the method of this invention further has the following effects.

(1) Although the gravelish material 11 and/or the sandy material 21 in the above Embodiments 1, 2, 3 and 4 has been described as being exposed to the surface of the surface-forming material 14, 23 by polishing with the use of a polishing device, the gravelish material 11 and/or the sandy material 21 can be solely exposed to the surface of the surface-forming material 14, 23 by retarding the hardening of the cement 12, 22 with the use of a retarding agent and then washing away the cement 12, 22.

Also, it is possible to roughen the surface by a sandblasting or shot blasting operation after curing.

(2) The decorative effect of the luminous construction material 16, 25, etc. can be enhanced further by appropriate choice of the luminous ore materials, taking into account the contrast between the color of the ore itself under the visible spectra of daylight and the luminescent color obtained from the ore under irradiation with ultraviolet rays.

For instance, a luminous construction material containing a gravelish material 11 and a sandy material 21 can be made by selecting the gravelish material 11 with great importance attached to visible rays and selecting the sandy material 21 with great importance placed on ultraviolet luminescence.

EMBODIMENT 5

This embodiment is characterized essentially by the steps of mixing an inorganic material containing an ultraviolet luminous substance with an unsaturated polyester or the like, then forming the resulting mixture into a pellet-like material of desired grain size by a pelletizer or the like, and molding the pellet-like material into a desired shape by hot pressing or the like.

In this embodiment, for example, suitable amounts of pellets with different colors can be readily charged into a mold, and then press molded under heating.

Alternatively, a liquid material containing an ultraviolet luminous substance may be poured into a mold, and thereafter a pellet-like or liquid material may be additionally poured into the mold to perform molding under heating, whereby a desired molded object can be obtained.

EMBODIMENT 6

A sixth embodiment of this invention will be described with reference to a flow sheet shown in FIGS. 4a–4e.

Figure 4A:
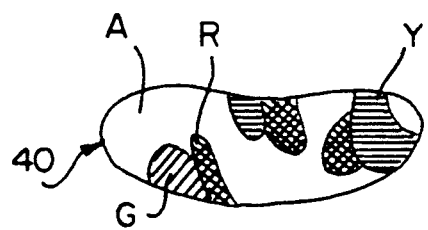
FIGS. 4a–e are illustration of processing steps in the method of making a luminous construction material according to a sixth embodiment of this invention.

First, as shown in FIG. 4(a), an ore 40 containing an ultraviolet luminous substance is prepared as an inorganic material containing an ultraviolet luminous substance.

As the ore 40, the same ores as used in Embodiment 1 may be used.

According to this embodiment, further, as shown in FIG. 4(a) the ore 40 contains a base component A which is not luminous with ultraviolet rays and ultraviolet luminous components G, R and Y which differ in color and are luminous with ultraviolet rays.

It is assumed here that the ultraviolet luminous components G, R and Y are respectively light brown, white and red under daylight and, when irradiated with ultraviolet rays, they emit light in green, red and yellow colors, respectively.

Figure 4B:
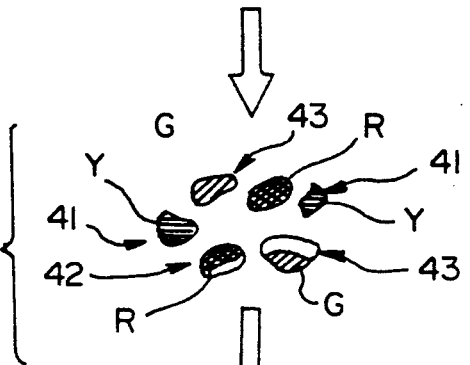

Next, the ore 40 is crushed by a crushing device such as a jaw crusher, to form gravelish materials 41, 42 and 43 of appropriate size and shape which respectively contain the ultraviolet luminous components G, R and Y, as shown in FIG. 4(b).

The gravelish materials 41, 42 and 43 are mixed into a slurry form block-forming material 14 which is a mixture of a cement, sand and water, followed by agitating. The composition of the block-forming material 44 may be, for example, 15% of the cement, 8% of water, 28% of the sand, 46% of the gravelish materials 41, 42 and 43, and 3% of pigment. All of the percentages (%) are percentages by weight.

In the case of a resin concrete, on the other hand, the composition may be, for example, 13% of an unsaturated polyester resin, 25% of calcium carbonate, 60% of the gravelish materials 41, 42 and 43, and 2% of pigment.

Figure 4C:
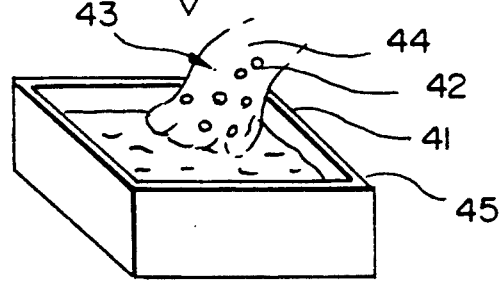

Subsequently, the block-forming material 44 is poured into a mold 45 as shown in FIG. 4(c). The block-forming material 44 is cured simultaneously with completion of the pouring operation or for a predetermined period of time.

Figure 4D:
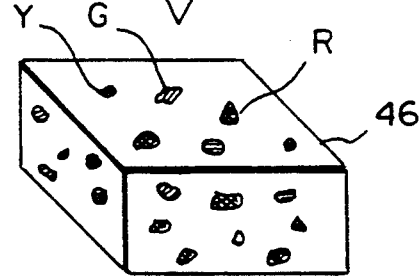
Figure 4E:
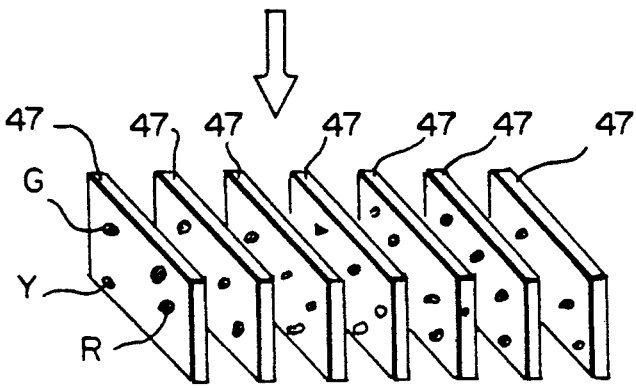

After the block-forming material 44 is cured and hardened sufficiently, the resulting concrete block 46 is taken out of the mold 45, as shown in FIG. 4(d).

The concrete block 46 is then cut into slices with a thickness of, for example, from 0.3 to 5 mm, preferably from 1 to 3 mm, by a cutter such as a diamond cutter, to produce a multiplicity of ultraviolet luminous sheets 47.

The ultraviolet luminous sheets 47 thus obtained have a concrete substrate 18 in which a large number of grains comprising the ultraviolet luminous components G, R and Y are dispersed.

Figure 5:
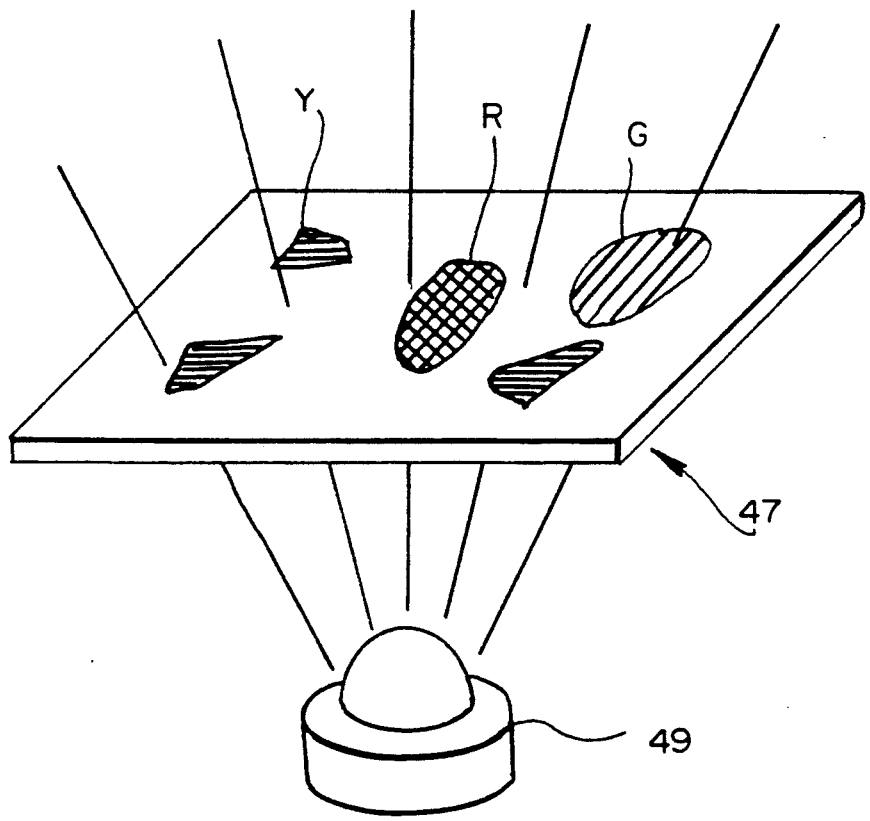
FIG. 5 is an illustration of processing steps in the method of making a luminous construction material according to a seventh embodiment of this invention.

Therefore, when the ultraviolet luminous sheet 47 is irradiated with ultraviolet rays from one side thereof by use of an ultraviolet irradiation device 49 as shown in FIG. 5, the ultraviolet rays penetrate the ultraviolet luminous sheet 47 to the other side. Consequently, the ultraviolet luminous sheet 47 emit light not only on the ultraviolet irradiation side but on the other side, resulting in a markedly enhanced light-decorative effect.

The spacing between the ultraviolet luminous sheet 47 and the ultraviolet irradiation device 49 can be freely changed, thereby changing the intensity of the ultraviolet rays reaching the luminous sheet 47.

The ultraviolet luminous components G, R and Y in the ultraviolet luminous sheet 47 have marked differences between the hue, value (lightness) and saturation (chroma) of their color under visible rays and the hue, value (lightness) and saturation (chroma) of their color under ultraviolet rays, and hence can provide a decoration with a surprising effect (a pseudo-stone wall under visible rays and luminescence under ultraviolet rays). This also enhances the light-decorative effect.

The ultraviolet luminous sheet 47 can be increased in strength and prevented from breakage, by adhering a transparent sheet of an acrylic resin, reinforced glass or the like to one or both sides of the luminous sheet 47 with a transparent adhesive based on an epoxy resin or the like.

Furthermore, the method of making an ultraviolet luminous sheet according to this invention has the following effects.

(1) The ore 40 constituting the inorganic material can be used as an ultraviolet luminous component, so that a sufficient amount of luminance can be ensured over many years, with prevention of the deterioration with time of pigment of the ultraviolet luminous component.

(2) Especially where the ores 40 containing ultraviolet luminous substances are used to constitute the inorganic material, the availability of the ores 40 at low price makes it possible to prepare a pigment at low cost and to manufacture a patterned or decorated construction material at low cost.

EMBODIMENT 7

In the above Embodiment 6, the gravelish materials 41, 42 and 43 have been described as being obtained by crushing an ore containing the ultraviolet luminous components G, R and Y. On the other hand, this embodiment is characterized in that such gravelish materials 41, 42 and 43 are obtained by mixing a plurality of artificial ultraviolet luminous agents into transparent resins (e.g., acrylic resin) or glasses, hardening the resins or glasses, and crushing the resins or glasses by a crusher such as a jaw crusher.

In the same manner as in Embodiment 6, the gravelish materials 41, 42 and 43 produced by the method just mentioned above are mixed into a slurry form block-forming material 44, which is a mixture of a cement, sand and water, then the resultant mixture is agitated and poured into a mold 45, followed by curing and hardening the block-forming material 44, and the resulting concrete block 46 is taken out of the mold 45. Thereafter, the concrete block 46 is cut into slices having a thickness of from 1 mm to several millimeters by a cutter such as a diamond cutter, to produce a multiplicity of ultraviolet luminous sheets 47. The ultraviolet luminous sheets 47 also have a large number of grains of ultraviolet luminous components G, R and Y dispersed in a concrete substrate 48.

As in Embodiment 6, therefore, when the ultraviolet luminous sheet 47 is irradiated with ultraviolet rays from one side thereof by use of an ultraviolet irradiation device 49, the ultraviolet rays penetrate the ultraviolet luminous sheet 47 to the other side, so that the ultraviolet luminous sheet 47 emit light not only on the ultraviolet irradiation side but on the other side. Consequently, a markedly enhanced light-decorative effect can be obtained.

Besides, a further light-decorative effect can be obtained by use of gravelish materials 41, 42 and 43 obtained by crushing ores, together with the artificial ultraviolet luminous agents. In such a case, colors or hues which cannot be obtained with the ores alone can be provided by the artificial ultraviolet luminous agents.

EMBODIMENT 8

Figure 6A:
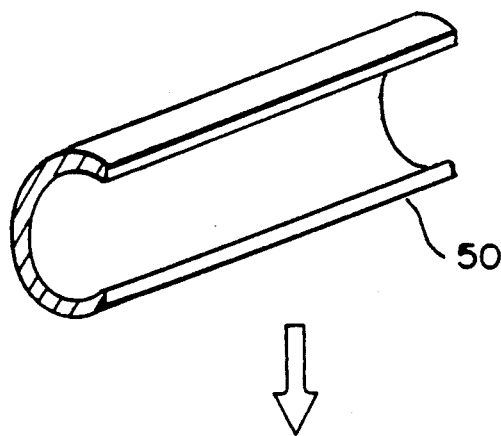
FIGS. 6a–c are an illustration of processing steps in the method of making a luminous construction material according to an eighth embodiment of this invention.
Figure 6B:
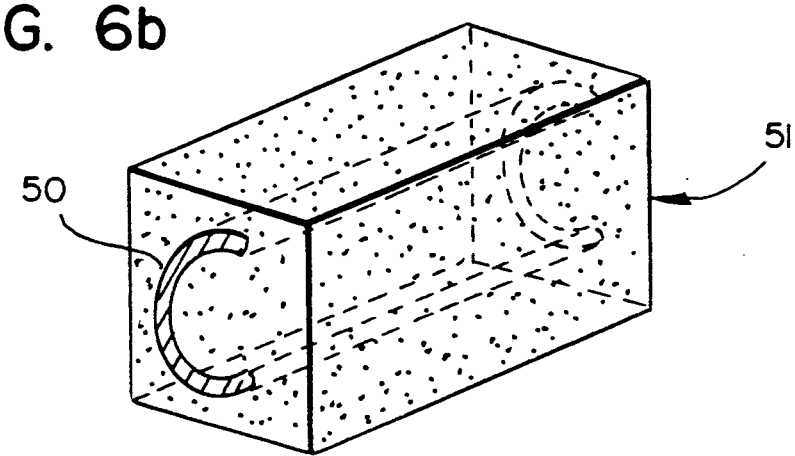
Figure 6C:
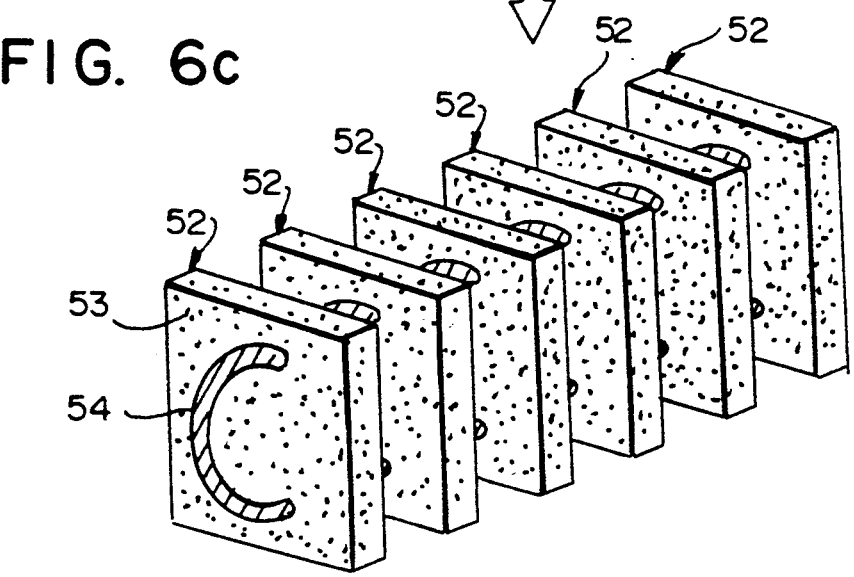

In this eighth embodiment of the invention, a massive (or lumpy or blocky) material 50 composed simply of or containing a plurality of ultraviolet luminous components is prepared as shown in FIG. 6(a), to be used in place of the gravelish materials 41, 42 and 43 used in Embodiment 7. The massive material 50 is mixed into the same block-forming material as used in Embodiment 7, followed by agitating. The mixture thus obtained is poured into a mold, and after curing and hardening the block-forming material, the resultant concrete block 51 as shown in FIG. 6(b) is taken out of the mold. The concrete block 51 is then cut into slices having a thickness of from 1 to several millimeters by a cutter such as a diamond cutter, to produce a multiplicity of ultraviolet luminous sheets 52. The ultraviolet luminous sheets 52 also can have the ultraviolet luminous components 54 contained patternwise in a concrete substrate 53.

Therefore, as in Embodiment 7, when the ultraviolet luminous sheet 52 is irradiated with ultraviolet rays from one side thereof by use of an ultraviolet irradiation device 49, the ultraviolet rays penetrate the ultraviolet luminous sheet 52 to the other side. Consequently, the ultraviolet luminous sheet 52 emit light not only on the ultraviolet irradiation side but on the other side, whereby a remarkably enhanced light-decorative effect can be obtained.

Industrial Applicability

This invention, constituted as described above, has the following industrial applicabilities.

(1) An inorganic material containing an ultraviolet luminous substance can be used as pigment after being formed into a gravelish, sandy or fragmentary material and, therefore, a sufficient amount of luminance can be ensured for many years, with prevention of the deterioration with time of pigment.

(2) Especially where ores containing ultraviolet luminous substances are used to constitute the inorganic material, the availability of the ores at low price makes it possible to prepare a pigment at low cost and to manufacture a patterned or decorated construction material at low cost.

(3) With the use of a large number of small pieces containing ultraviolet luminous substances as pattern-composing pieces, patterns complicated in shape and varying in color can be easily produced on the surface of the concrete block.

(4) According to this invention, an ore containing a component luminous with ultraviolet rays or an artificially refined inorganic ultraviolet luminous component is mixed into a concrete in a massive or minutely dispersed form, the concrete is then molded into a desired shape, followed by hardening and curing to produce a concrete block, and the concrete block is cut to make a plurality of ultraviolet luminous sheets having the ultraviolet luminous component scattered or discretely contained in a concrete substrate.

Therefore, various limitations imposed on the use of an ore containing an ultraviolet luminous component can be eliminated, and free designing with light decoration can be achieved.

I claim:

1. A method of making a luminous construction material comprising:
   mixing an amount, sufficient to make said luminous construction material of at least one of an inorganic material containing a substance luminous in response to ultraviolet rays and an amount, sufficient to make said luminous construction material, of an artificially refined inorganic component luminous in response to ultraviolet rays into an amount, sufficient to make said luminous construction material, of a concrete to create a mixture; molding said mixture to make a concrete block; curing said concrete block; and cutting said concrete block to produce a plurality of ultraviolet luminous plates.

2. The mixture according to claim 1, wherein said concrete comprises an admixture of an amount, sufficient to make said luminous construction material, of a cement and water.

3. The method according to claim 1, wherein said concrete comprises an admixture of an amount, sufficient to make said luminous construction material, of a cement, water and aggregate.

4. The method according to claim 1, wherein said concrete is a resin concrete.

5. The method according to claim 1, wherein said inorganic material is an ore.

6. A method of making luminous plates for construction use comprising:
   mixing an amount, sufficient to make said luminous construction material, of at lest one of an artificial material, luminous in response to ultraviolet light, into a transparent resin to create a mixture;
   curing said mixture and crushing said mixture to produce a plurality of resin pieces luminous in response to ultraviolet light;
   mixing said plurality of luminous resin pieces into a concrete;
   molding, hardening, and curing said concrete to make a concrete block; and
   cutting said concrete block to produce a plurality of plates luminous in response to ultraviolet light.

7. A method of making luminous plates for construction use comprising:
   mixing an amount, sufficient to make said luminous construction material, of at least one of an artificial material, luminous in response to ultraviolet light, into a transparent glass to create a mixture;
   curing said mixture and crushing said mixture to produce a plurality of glass pieces luminous in response to ultraviolet light;

mixing said plurality of luminous glass pieces into a concrete;

molding, hardening, and curing said concrete to make a concrete block; and cutting said concrete block to produce a plurality of plates luminous in response to ultraviolet light.

8. The method according to claim 6, wherein said concrete comprises an admixture of an amount, sufficient to make said luminous construction material, of a cement and water.

9. The method according to claim 6, wherein said concrete comprises an admixture of an amount, sufficient to make said luminous construction material, of a cement, water and aggregate.

10. The method according to claim 6, wherein said concrete is a resin concrete.

11. The method according to claim 7, wherein said concrete comprises an admixture of an amount, sufficient to make said luminous construction material, of a cement and water.

12. The method according to claim 7, wherein said concrete comprises an admixture of an amount, sufficient to make said luminous construction material, of a cement, water and aggregate.

13. The method according to claim 7, wherein said concrete is a resin concrete.

14. A method of making a construction material luminous in response to ultraviolet light comprising:

mixing an amount, sufficient to make said luminous construction material, of at least one material luminous in response to ultraviolet light with a concrete to create a first mixture;

combining said mixture with an amount, sufficient to make said luminous construction material, of a concrete to create a second mixture; and curing said second mixture to obtain a construction material luminous in response to ultraviolet light.

15. The method according to claim 14, wherein:

said concrete in said first mixture includes a cement in a range of from about 40-50 weight % of said first mixture, a sand in a range of from about 10-30 weight % of said first mixture, and a water in a range of from about 15-25 weight % of said first mixture; and said material luminous in response to ultraviolet light in said first mixture is present in a range of from about 10-30 weight % of said first mixture.

16. The method according to claim 14, wherein said concrete is a resin concrete.

17. A construction material luminous in response to ultraviolet light comprising:

at least one ore luminous in response to ultraviolet light;

a cured concrete mixture; and said luminous ore is dispersed in said cured concrete mixture.

* * * * *